United States Patent
Harada et al.

(10) Patent No.: US 12,392,794 B2
(45) Date of Patent: Aug. 19, 2025

(54) FLOW PATH WASHING METHOD OF AUTO SAMPLER AND FLOW PATH WASHING APPARATUS OF AUTO SAMPLER

(71) Applicant: HITACHI HIGH-TECH CORPORATION, Tokyo (JP)

(72) Inventors: Yushi Harada, Tokyo (JP); Yuichiro Hashimoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 306 days.

(21) Appl. No.: 18/038,273

(22) PCT Filed: Dec. 10, 2021

(86) PCT No.: PCT/JP2021/045517
§ 371 (c)(1),
(2) Date: May 23, 2023

(87) PCT Pub. No.: WO2022/131153
PCT Pub. Date: Jun. 23, 2022

(65) Prior Publication Data
US 2024/0094236 A1   Mar. 21, 2024

(30) Foreign Application Priority Data

Dec. 16, 2020   (JP) ................................ 2020-208705

(51) Int. Cl.
*G01N 35/10*   (2006.01)
*B08B 9/032*   (2006.01)

(52) U.S. Cl.
CPC ....... *G01N 35/1004* (2013.01); *B08B 9/0325* (2013.01); *B08B 2209/032* (2013.01); *G01N 2035/1006* (2013.01)

(58) Field of Classification Search
CPC ................... G01N 35/1004; G01N 2035/1006
See application file for complete search history.

(56) References Cited

U.S. PATENT DOCUMENTS

| | | |
|---|---|---|
| 2004/0175833 A1 | 9/2004 | Tatsumi |
| 2008/0134804 A1 | 6/2008 | Maeda et al. |

(Continued)

FOREIGN PATENT DOCUMENTS

| | | |
|---|---|---|
| CN | 105057294 A | 11/2015 |
| JP | H04-169851 A | 6/1992 |

(Continued)

OTHER PUBLICATIONS

Machine translation of JP 2011220928 A (Year: 2011).*
(Continued)

*Primary Examiner* — Nathaniel J Kolb
(74) *Attorney, Agent, or Firm* — Miles & Stockbridge, P.C.

(57) ABSTRACT

A flow path washing method and apparatus for an auto sampler in which, when a cleaning fluid supplied to a flow path which is switched between a first flow path including a nozzle for aspirating a sample and a sample loop for holding the aspirated sample, and a second flow path including a washing tub for washing at least an outer wall of the nozzle, a control unit changes a flow velocity of the cleaning fluid supplied between measurement of a first measurement item and measurement of a second measurement item based on washing information showing washing patterns corresponding to measurement items of the sample, including at least one of first washing information showing a washing pattern corresponding to the first measurement item of the sample and second washing information showing a washing pattern corresponding to the second measurement item to be measured subsequent to the first measurement item.

5 Claims, 8 Drawing Sheets

(56) References Cited

U.S. PATENT DOCUMENTS

| | | |
|---|---|---|
| 2011/0209565 A1 | 9/2011 | Tomita |
| 2013/0333452 A1 | 12/2013 | Suzuki et al. |
| 2014/0363896 A1 | 12/2014 | Suzuki et al. |
| 2020/0340957 A1* | 10/2020 | Nogami et al. ........ G01N 30/28 |

FOREIGN PATENT DOCUMENTS

| | | | | |
|---|---|---|---|---|
| JP | H06207944 A | * | 7/1994 | |
| JP | 2945747 B2 | * | 9/1999 | |
| JP | 2004-271241 A | | 9/2004 | |
| JP | 2008-145112 A | | 6/2008 | |
| JP | 2011-179839 A | | 9/2011 | |
| JP | 2011-220928 A2 | | 11/2011 | |
| JP | 2011220928 A | * | 11/2011 | ......... G01N 35/1004 |
| JP | 2012117945 A | * | 6/2012 | ............ G01N 30/24 |
| JP | 2014-106213 A | | 6/2014 | |
| WO | 2013099660 A1 | | 7/2013 | |
| WO | 2017154083 A1 | | 9/2017 | |
| WO | 2020213061 A1 | | 10/2020 | |

OTHER PUBLICATIONS

Machine translation of JP 2012117945 A (Year: 2012).*
Machine translation of H06207944 A (Year: 1994).*
Machine translation of JP 22945747 B2 (Year: 1999).*
Search Report mailed Feb. 8, 2022 in International Application No. PCT/JP2021/045517.
Written Opinion mailed Feb. 8, 2022 in International Application No. PCT/JP2021/045517.

* cited by examiner

FIG. 5

| NO. | MEASUREMENT ITEM | WASHING PATTERN |
|---|---|---|
| 1 | TESTOSTERONE | A |
| 2 | ESTRADIOL | B |
| 3 | GENTAMYCIN | C |
| 4 | ESTRADIOL | B |
| 5 | ... | ... |
|  |  |  |

FIG. 6

| WASHING PATTERN | CLEANING FLUID (INNER WALL WASHING) | CLEANING FLUID (OUTER WALL WASHING) | FLOW VELOCITY OF CLEANING FLUID | WASHING TIME (INNER WALL) | WASHING TIME (OUTER WALL) |
| --- | --- | --- | --- | --- | --- |
| A | MeOH | MeOH | 2 | 10 | 10 |
| B | MeOH | MeOH | 5 | 15 | 5 |
| C | EXTRA PURE WATER | SYSTEM WATER | 2 | 10 | 10 |
| D | EXTRA PURE WATER | SYSTEM WATER | 5 | 15 | 5 |

# FLOW PATH WASHING METHOD OF AUTO SAMPLER AND FLOW PATH WASHING APPARATUS OF AUTO SAMPLER

TECHNICAL FIELD

The present invention relates to a flow path washing method of an auto sampler that is a sample introduction unit of an automatic analyzer that analyzes a plurality of measurement items and flow path washing device of the auto sampler.

BACKGROUND ART

One example of an automatic analyzer includes a liquid chromatograph/mass spectrometer (HPLC/MS). The liquid chromatograph/mass spectrometer is a device that combines a liquid chromatograph and a mass spectrometer. Qualitative and quantitative analysis of each component in a sample can be performed by combining separation by chemical structure and physical properties of a substance to be measured by liquid chromatography (HPLC) and separation and detection by mass of the substance to be measured by mass spectrometry (MS). Therefore, it is possible to analyze the substance to be measured qualitatively and quantitatively even in case of samples which are metabolized in the body and in which many similar substances are mixed, such as pharmaceuticals in biological samples, application to the field of clinical testing is expected.

In a liquid chromatograph/mass spectrometer, which is one example of an automatic analyzer, when a plurality of samples are analyzed, as a method of reducing carry-over, a method of washing a sample injection needle and a technique for devising a washing mechanism that performs washing are disclosed.

For example, PTL 1 discloses an auto sampler of a liquid chromatograph, in which needles are washed while a cleaning fluid is being supplied to a washing tub, and needles are washed with switching the kind of cleaning fluid according to the kind of the sample adhering to the needle.

PTL 2 discloses an auto sampler washing mechanism that can maintain liquid feeding without time loss during liquid feeding like a pump or a syringe mechanism in the related art by using a diaphragm pump to feed a cleaning fluid when washing the inside of a sample introduction needle and a sample loop.

CITATION LIST

Patent Literature

PTL 1: JP2004-271241A
PTL 2: JP2008-145112A

SUMMARY OF INVENTION

Technical Problem

In recent years, needs for automatic analyzers include processing a large number of specimens in a short period of time, that is, improving throughput and preventing an increase in testing costs accompanied with an increase in the number of specimens to be processed. As a result, it is preferable to improve throughput by shortening the processing time per sample, and to reduce testing costs by minimizing reagent consumption and reducing cleaning fluid consumption per sample. On the other hand, due to the shortening of the processing time per specimen and the reduction of the cleaning fluid consumption, washing of a sample introduction unit before and after the measurement sample is dispensed becomes insufficient, and carry-over that causes measurement errors among a plurality of samples may be detected. Therefore, it is preferable to simultaneously improve throughput, reduce cleaning fluid consumption, and reduce carry-over.

However, when a plurality of samples are continuously analyzed, there is a limit to the amount of time that a nozzle that introduces (dispenses) a predetermined amount of sample can spend processing one specimen, and thus there may be a case where it is not possible to secure sufficient time to wash the nozzle after dispensing.

In PTL 1, it is possible to reduce influence of the carry-over by washing a needle while supplying a cleaning fluid to a washing tub or washing a needle with switching the kind of cleaning fluid according to the kind of the sample adhering to the needle. However, there are some cases where it is preferable to perform washing for a long period of time to reduce carry-over, such as a case after measuring a high-concentration sample. That is, if washing for a predetermined washing time is insufficient, throughput of analysis may be reduced due to washing at the expense of throughput of analysis.

In PTL 2, it is possible to efficiently use limited washing time to reduce time loss during liquid accompanied by the feeding of the cleaning fluid by using a diaphragm pump to feed a cleaning fluid when washing the inside of a sample introduction needle and a sample loop or the like. In case of minimizing the influence of carry-over as small as possible, a sufficient cleaning effect can be expected by setting the flow velocity of the cleaning pump to a high value in advance. However, even in a case of measurements where the influence of carry-over is negligible and measurements that do not require washing, the cleaning fluid is fed at a high flow rate, and thus the consumption of the cleaning fluid tends to increase due to excessive washing.

An object to be achieved by the present disclosure is to provide a flow path washing method of an auto sampler achieving both preventing a reduction in throughput of analysis and preventing an increase in cleaning fluid consumption and a flow path washing device of the auto sampler.

Solution to Problem

According to the present disclosure, a flow path washing method of an auto sampler in which, when a cleaning fluid supply mechanism supplies cleaning fluid to a flow path which is switched by a flow path switching mechanism, among a first flow path including a nozzle for aspirating a sample and a sample loop for holding the sample aspirated from the nozzle and a second flow path including a washing tub for washing at least an outer wall of the nozzle, a control unit changes a flow velocity of the cleaning fluid supplied between measurement of a first measurement item and measurement of a second measurement item based on, among washing information showing washing patterns corresponding to measurement items of the sample, first washing information showing a washing pattern corresponding to the first measurement item of the sample and second washing information showing a washing pattern corresponding to the second measurement item to be measured subsequent to the first measurement item. Other solutions are described below in Description of Embodiments.

Advantageous Effects of Invention

According to the present disclosure, it is possible to provide a flow path washing method of an auto sampler achieving both preventing a reduction in throughput of analysis and preventing an increase in cleaning fluid consumption and a flow path washing device of the auto sampler.

BRIEF DESCRIPTION OF DRAWINGS

FIG. 5 is a schematic diagram of a sample table according to the present embodiment.

FIG. 6 shows one example of a table determining washing conditions before dispensing samples according to the present embodiment.

DESCRIPTION OF EMBODIMENTS

Figure 1:
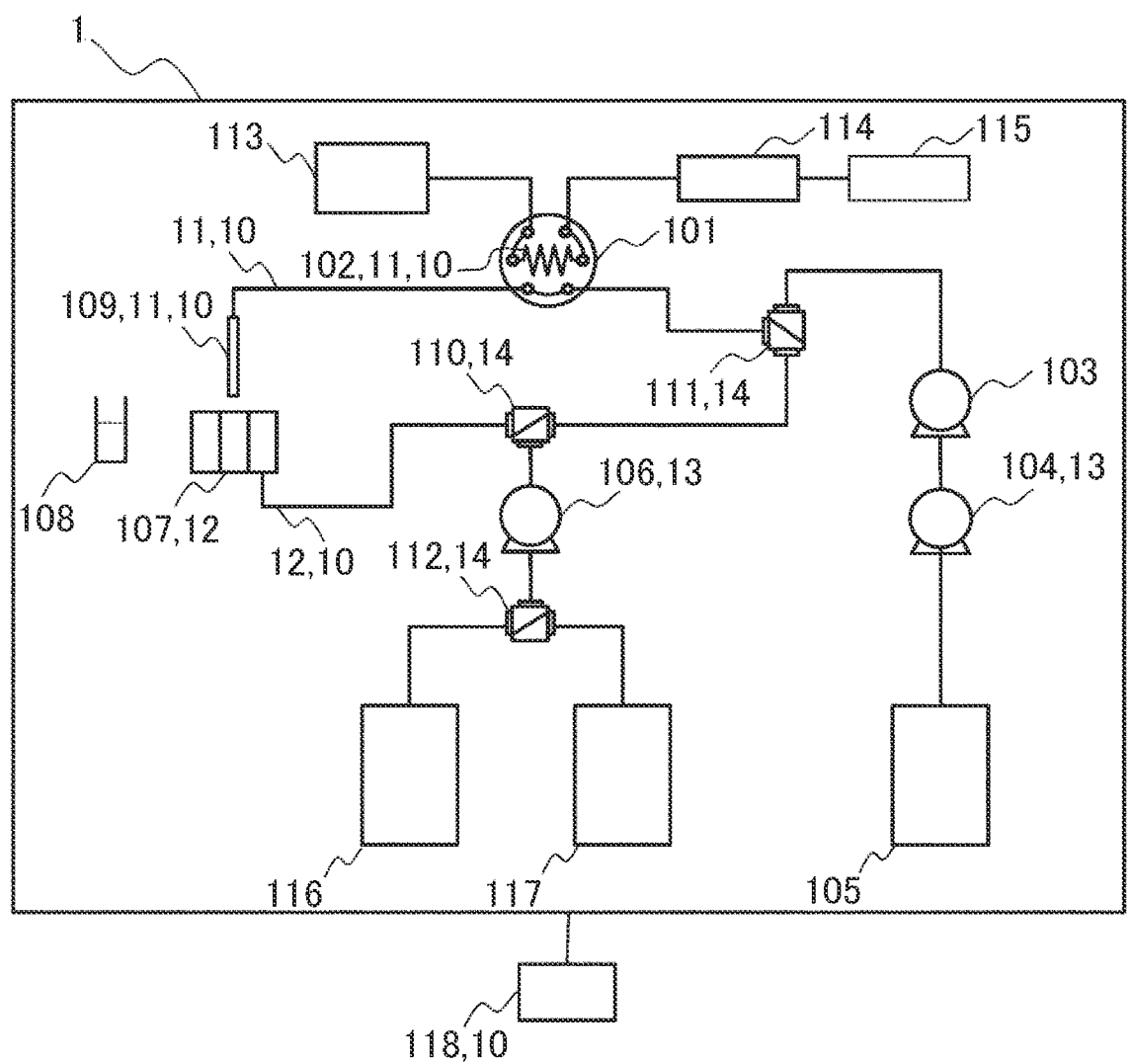
FIG. 1 is a schematic diagram of an auto sampler according to the present embodiment.

Hereinafter, modes for carrying out the present disclosure (referred to as embodiments) are described with reference to the drawings. In the following description of one embodiment, other embodiments applicable to the one embodiment are also described as appropriate. The present disclosure is not limited to one embodiment below, and different embodiments can be combined or arbitrarily modified within a range that does not significantly impair the effects of the present disclosure. The same members are denoted by the same reference numerals, and overlapping descriptions are omitted. Those having the same function shall have the same name. The illustrated contents are only schematic, and for convenience of illustration, the actual configuration may be changed within a range that does not significantly impair the effects of the present disclosure.

In the following description, a sample introduction unit of an automatic analyzer that analyzes a plurality of measurement items is referred to as an auto sampler. Although the sample introduction unit of an automatic analyzer is mainly targeted in the present embodiment, the present disclosure is applicable not only to the automatic analyzer but also to general analysis devices including a sample introduction unit.

FIG. 1 is a schematic diagram of an auto sampler 1 according to the present embodiment. The auto sampler 1 includes a sample introduction valve 101, a sample loop 102, a measurement unit 103, a gear pump 104, a system water 105, a washing pump 106, a washing tub 107, a sample cup 108, a nozzle 109, solenoid valves 110, 111, and 112, a feed pump 113, a separate column 114, a detector 115, and cleaning fluids 116 and 117 (containers for cleaning fluids). All components are connected by a flow path such as a pipe (not shown). Both the system water 105 and the cleaning fluids 116 and 117 are stored, for example, in tanks (not shown).

A flow path washing device 10 of the auto sampler 1 includes a first flow path 11, a second flow path 12, the cleaning fluid supply mechanism 13, a flow path switching mechanism 14, and a control unit 118. The first flow path 11 includes the nozzle 109 that aspirates a sample and the sample loop 102 that holds the sample aspirated from the nozzle 109. The inner wall of the nozzle 109 is washed by the circulation of the cleaning fluids 116 and 117 to the first flow path 11. The inner wall of the nozzle 109 may be washed by using water such as ultrapure water or the system water 105 as the cleaning fluid, if necessary.

The second flow path 12 includes the washing tub 107 for washing at least the outer wall of the nozzle 109. The cleaning fluid supply mechanism 13 supplies the cleaning fluids 116 and 117 to the first flow path 11 and the washing tub 107 via the second flow path 12, respectively. Details thereof are described below, but the nozzle 109 is introduced to the washing tub 107 to which the cleaning fluids 116 and 117 are introduced and is brought into contact with the cleaning fluids 116 and 117, so that at least the outer wall of the nozzle 109 is washed. The outer wall of the nozzle 109 may be washed with water such as ultrapure water or the system water 105 as the cleaning fluid, if necessary. The cleaning fluid supply mechanism 13 includes the washing pump 106.

The flow path switching mechanism 14 switches the supply destination of the cleaning fluid supplied from the cleaning fluid supply mechanism 13 to the first flow path 11 and the second flow path 12. The flow path switching mechanism 14 includes the solenoid valves 110, 111, and 112.

The control unit 118 controls the driving of the auto sampler 1 and is connected to the auto sampler 1 through an electric signal line (not shown). Though described with reference to FIGS. 5 and 6, the control unit 118 changes the flow velocity of the cleaning fluids 116 and 117 supplied between measurement of a first measurement item and measurement of a second measurement item based on first washing information showing a washing pattern corresponding to of the first measurement item and second washing information showing a washing pattern corresponding to the second measurement item measured subsequent to the first measurement item. The first washing information and second washing information both are examples of washing information showing washing patterns corresponding to measurement items of a sample.

Though all are not shown, the control unit 118 includes, for example, a central processing unit (CPU), a random access memory (RAM), and a read only memory (ROM). The control unit 118 is implemented by loading a predetermined control program stored in the ROM onto the RAM and executing the program by the CPU.

According to the present embodiment, the sample is installed in a sample processing unit (not shown) of an automatic analyzer (not shown) and is transferred to a pre-processing unit (not shown). The sample is purified and concentrated in a pre-processing unit, and the sample cup 108 including the sample is transferred to a sample cup holding unit (not shown) of the auto sampler 1. As the sample introduction valve 101, a 6-port 2-position valve is used in the present embodiment, a high-pressure valve having a pressure resistance function of a high pressure (for example, 100 MPa) is used.

Figure 2A:
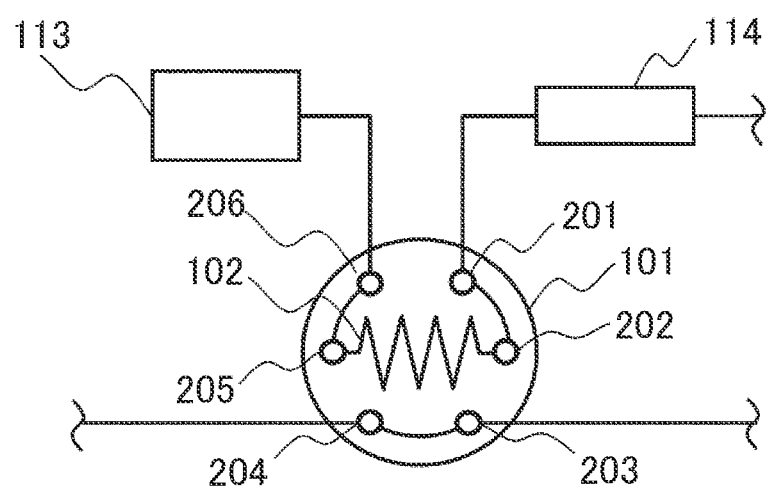
FIG. 2A is a schematic diagram of a 6-port 2-position valve showing a sample introduction valve according to the present embodiment and is showing a first position.

FIG. 2A is a schematic diagram of a 6-port 2-position valve showing the sample introduction valve 101 according to the present embodiment and is a diagram showing a first position. The sample introduction valve 101 includes six ports 201, 202, 203, 204, 205, and 206. The port 201 is connected to the separate column 114, the ports 202 and 205 are connected to the sample loop 102, the port 203 is connected to a solenoid valve 111 (FIG. 1), the port 204 is connected to the nozzle 109 (FIG. 1), and the port 206 is connected to the feed pump 113.

Though all are not shown, the sample introduction valve 101 has a structure in which states in which adjacent ports are connected are switched each other by rotation of valve heads at two positions to switch the flow paths of a groove provided in an internal rotor seal. At a first position shown in FIG. 2A, the feed pump 113, the sample loop 102, and the separate column 114 are connected to each other via flow paths (not shown) in the sample introduction valve 101. At the first position, the flow path from the feed pump 113 is connected to the sample loop 102, and thus liquid is fed, for example, under the high pressure condition of 100 MPa at maximum.

Figure 2B:
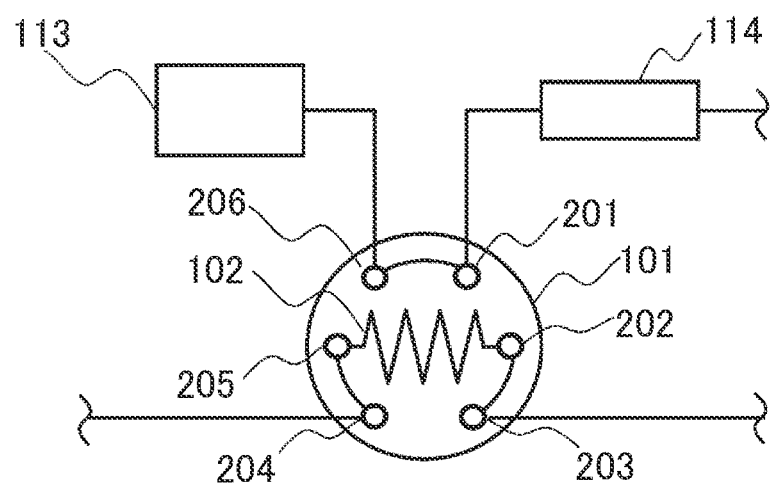
FIG. 2B is a schematic diagram of a 6-port 2-position valve showing a sample introduction valve according to the present embodiment and is showing a second position.

FIG. 2B is a schematic diagram of a 6-port 2-position valve showing the sample introduction valve 101 according to the present embodiment and is a diagram showing a second position. At the second position shown in FIG. 2B, the nozzle 109 (FIG. 1), the sample loop 102, and the solenoid valve 111 (FIG. 1) are connected to each other via flow paths (not shown) in the sample introduction valve 101. At the second position, the measurement unit 103 or the gear pump 104 (FIG. 1) on the latter part of the measurement unit 103 is connected to the sample loop 102. Therefore, liquid is fed under the low pressure condition of, for example, 1 MPa or less at maximum, typically, for example, 300 KPa.

In case of the switch from the first position (FIG. 2A) to the second position (FIG. 2B), the flow path in the sample loop 102 fluctuates from high pressure to low pressure. Meanwhile, in case of the switch from the second position to the first position, the flow path in the sample loop 102 fluctuates from low pressure to high pressure.

Referring back to FIG. 1, the sample loop 102 is made of stainless steel (SUS) in the present embodiment, and is a pipe, for example, with an inner diameter of 0.3 mm, an outer diameter of 1/16 inches, a length of 283 mm, and a volume of 20 μL. In addition to SUS, materials may be resin pipe such as polyether ether ketone (PEEK), PEEKsil (outer surface of fused silica is coated with PEEK), polytetrafluoroethylene (PTFE), and copolymers of tetrafluoroethylene and perfluoroalkoxyethylene. The dimensions may also be changed as appropriate according to the measurement conditions.

The measurement unit 103 includes a syringe and a stepping motor (both not shown) and controls the driving amount of the syringe (not shown) by pulse control. According to the present embodiment, for example, a syringe having an inner diameter of 23.8 mm, a length of 85 mm, and a plunger capacity of 723 μL is used. The syringe may be driven by a servomotor instead of the stepping motor.

The gear pump 104 is arranged on the latter part of the measurement unit 103 and supplies pure water, which is the system water 105, to the measurement unit 103 and the flow path on the former part of the syringe (not shown). A two-way solenoid valve (not shown) is arranged between the measurement unit 103 and the system water 105, and the system water 105 is supplied into the measurement unit 103 by opening/closing control of the two-way solenoid valve. The pressure during supply is, for example, 300 kPa in the present embodiment. The pressure is appropriately changed, for example, by the pressure resistance of the two-way solenoid valve or the solenoid valve 111 arranged on the former part of the gear pump 104. The flow velocity of the system water 105 may be changed by the gear pump 104.

As the washing pump 106, a tube pump is used in the present embodiment. The washing pump 106 may be a diaphragm pump. The flow path of the washing pump 106 is connected to the solenoid valve 110.

Figure 3:
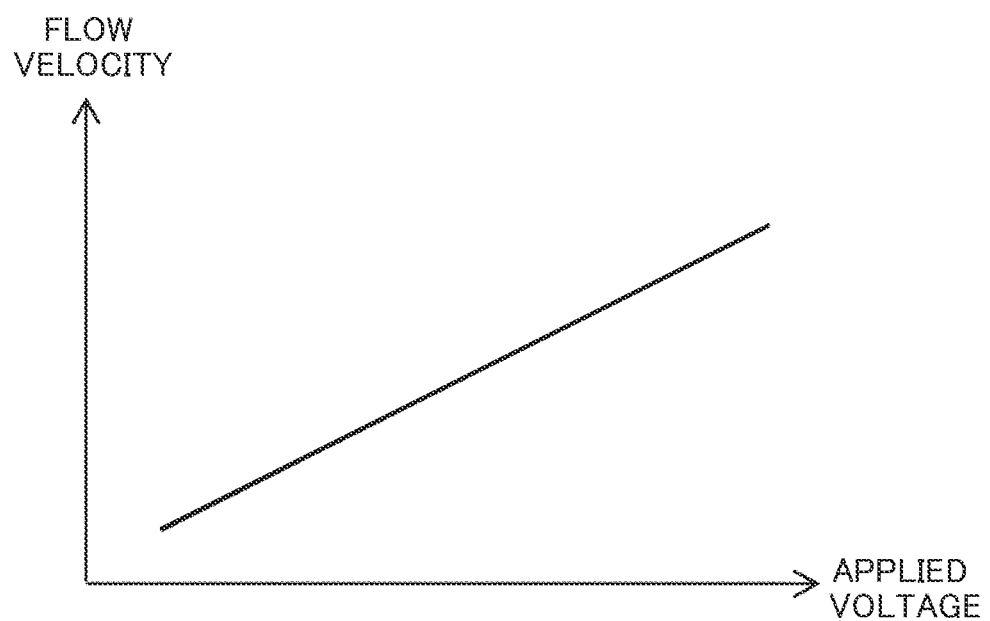
FIG. 3 shows a relationship between a voltage applied to a washing pump and flow velocity according to the present embodiment.

FIG. 3 shows a relationship between a voltage applied to the washing pump 106 and flow velocity (liquid feeding flow rate) according to the present embodiment. The relationship is stored in the control unit 118 (FIG. 1), for example, as the graph shown. The flow velocity can be changed by changing the voltage applied to the washing pump 106. For example, by increasing the applied voltage, the flow velocity can be increased, for example, linearly. The applied voltage is controlled by the control unit 118, for example.

Referring back to FIG. 1, the solenoid valve 112 that is, for example, a three-way solenoid valve is provided upstream of the washing pump 106. By switching the solenoid valve 112, the cleaning fluids 116 and 117 are used. In the present embodiment, the cleaning fluid 116 is, for example, acetonitrile, and the cleaning fluid 117 is, for example, methanol. The kinds of the cleaning fluids 116 and 117 are determined by the washing pattern (washing conditions) set by the user for each measurement item, and the cleaning fluids 116 and 117 are used to wash the first flow path 11 including the nozzle 109 and the sample loop 102. The cleaning fluids 116 and 117 can be supplied to the washing tub 107 by switching the solenoid valve 110.

Figure 4:
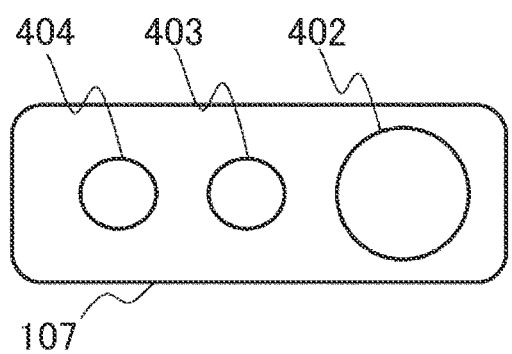
FIG. 4 is a schematic diagram of a washing tub of according to the present embodiment.

FIG. 4 is a schematic diagram of the washing tub 107 of according to the present embodiment. The washing bath 107 washes at least the outside of the nozzle 109 by immersing the nozzle 109 in the supplied cleaning fluids 116 and 117. The washing tub 107 includes a drain port 402, an organic solvent washing port 403 and a water washing port 404. The cleaning fluids 116 and 117 (FIG. 1) are supplied to the organic solvent wash port 403, and the system water 105 (FIG. 1) is supplied to the water washing port 404. Although the details are be described below, the cleaning fluids used for washing the inside of the nozzle 109 and the system water 105 are discharged to the drain port 402.

Referring back to FIG. 1, the sample cup 108 is a quality-controlled cup. In the present embodiment, a cup, for example, of which the material is polypropylene, the inner diameter of the lower part is 5 mm, the inner diameter of the upper part is 6 mm, the height is 26 mm, and the volume is 250 μL is used. The sample cup 108 is held at a sample cup holding position (not shown). For example, a sample including a component to be measured that is processed in the pre-processing unit (not shown) is transferred to the sample cup 108, and the sample cup 108 containing the sample is held at the sample cup holding position.

In the present embodiment, the nozzle 109 is a pipe, for example, of which the material is stainless steel (SUS), the inner diameter is 0.8 mm, the outer diameter is 1.5 mm, the height is 50 mm, and the volume is 25 μL. Surface polishing is performed on the inner side for carry-over reduction. A fitting for zero dead volumes is used for a connection portion (not shown) of a pipe connecting the nozzle 109 and the sample introduction valve 101 to reduce the dead volume. As a result, diffusion of the sample can be prevented and carry-over can be reduced.

The solenoid valve 110 is a three-way solenoid valve of a rocker type in the present embodiment. In the three-way solenoid valve, the flow path of the washing pump 106 is connected to a COM (common port, not shown) side, the flow path of the solenoid valve 111 is connected to a normally open (always open, not shown) side, and the washing tub 107 is connected to a normally closed (always closed, not shown) side. In case of washing the inner side of the sample loop 102, the sample introduction valve 101, and the nozzle 109, the flow path is connected to the normally open side. In case of supplying the cleaning fluids 116 and 117 to the washing tub 107, the flow path is connected to the normally closed side. Accordingly, washing solution is supplied to the organic solvent washing port 403.

The solenoid valve 111 is a three-way solenoid valve of a rocker in the present embodiment. In the three-way solenoid valve, the flow path of the sample introduction valve 101 is connected to the COM (common port. not shown) side, the solenoid valve 110 is connected to the normally open (always open. not shown) side, and the flow path of the measurement unit 103 is connected to the normally closed (always closed. not shown) side. During aspiration and discharge using the measurement unit 103 and liquid feeding from the gear pump 104, the flow path is connected to the normally closed side. In case of cleaning fluid supplying of the cleaning fluids 116 and 117 from the washing pump 106, the flow path is connected to the normally open side, and the first flow path 11 including the sample loop 102, the sample introduction valve 101, and the nozzle 109 is washed.

The feed pump 113 includes two plungers (all not shown) and feeds two kinds of liquid feeding solvents continuously under high pressure, for example, 100 MPa, by driving the two plungers in a reciprocating manner. In the present embodiment, the feed pump 113 incorporates two pumps (all not shown) and feeds liquid while changing the drive ratio of each pump according to the gradient conditions set by the user for each measurement item.

A mixer (not shown) is provided on the latter part of the feed pump 113, and the liquid feeding solvents fed from the two pumps are mixed by the mixer. The mixer is, for example, a low pressure solenoid valve (not shown). By driving the low pressure solenoid valve according to the mixing conditions set by the user for each component to be measured, the solvent ratio of the liquid feeding solvent can be changed. In the present embodiment, six kinds of liquids of ultrapure water, acetonitrile, methanol, formic acid of 1 mol/L, ammonia water of 1 mol/L, and ammonium acetate of 1 mol/L are used as the liquid feeding solvents. The six kinds of liquids are mixed by a low pressure solenoid valve and then sent to two pumps, and the gradient liquids are fed while changing the driving ratio of the two pumps. The flow velocity of the liquid feeding solvent may be changed by the feed pump 113.

In the present embodiment, the separation column 114 is configured by containing a filler having an inner diameter of 1.0 mm, a length of 50 mm, and a particle diameter of 2.6 mm in a column body (not shown). For example, a reversed-phase mode is used as the separation mode. However, the separation mode may not be a reversed phase mode but may be any one of a normal phase mode, a molecular weight fractionation mode, hydrophilic interaction chromatography mode (HILIC mode), and an antigen-antibody reaction mode.

As the detector 115, in the present embodiment, for example, a detector used in a triple quadrupole mass spectrometer (TripleQ-MS) is used because the quantitative properties are excellent. The mass spectrometer may not be a triple quadrupole mass spectrometer but may be an ion trap mass spectrometer (Iontrap-MS) or a time-of-flight mass spectrometer (TOF-MS). Instead of the mass spectrometer, the detector may be a diode array detector, a UV detector, or a fluorescence detector.

Next, a procedure for determining a washing method and washing conditions for the nozzle 109 in the present embodiment is described.

FIG. 5 is a schematic diagram of a sample table according to the present embodiment. For the number of specimens to be measured (not shown) and for each measurement item of each specimen, the washing pattern is designated before sample dispensing, that is, between the measurement of any measurement item and the measurement of the next measurement item after that measurement item. The washing pattern for each measurement item is preferably determined considering the detection sensitivity of the component to be measured in the specimen (measurement item in the sample), the size of the dynamic range, the size of the influence of carry-over, and the like. The control unit 118 (FIG. 1) of the automatic analyzer controls the flow path washing device 10 (FIG. 1) to perform washing according to the washing conditions specified in the set washing pattern.

Washing patterns in a sample table may be assigned by the user or may be set automatically. When setting automatically, for example, a database of a combination of sets of arbitrary first (for example, No. 1) measurement items and the next (for example, No. 2) measurement items and appropriate washing patterns before dispensing for each measurement item in the set is preset. Then, based on the database, a corresponding appropriate washing pattern can be acquired from the order of the measurement items.

FIG. 6 shows one example of a table determining washing conditions before dispensing samples according to the present embodiment. Specific conditions (washing conditions) of the washing pattern performed before sample dispensing are shown for each measurement item. For example, like washing patterns A to D, a washing condition showing a washing pattern for each measurement item can be selected. The table includes washing information indicating a washing pattern corresponding to the measurement item of the sample. The washing information includes at least one of the kinds of the cleaning fluids 116 and 117 for washing the first flow path 11 (FIG. 1) and water as the cleaning fluid, the kinds of the cleaning fluids 116 and 117 supplied to the washing tub 107 (FIG. 1) through the second flow path 12 (FIG. 1), the flow velocity of the cleaning fluids 116 and 117, the washing time of the first flow path 11, and washing time of the outer wall of the nozzle 109 in the washing tub 107. The illustrated example includes the kinds of the cleaning fluids 116 and 117 and water as the cleaning fluid (the inner wall and the outer wall of the nozzle 109 respectively), the flow velocity of the cleaning fluids 116 and 117 and the water as the cleaning fluid, the washing time for each washing location (inner and outer walls of the nozzle 109, respectively).

As exemplified in FIG. 3 above, the flow velocity of the cleaning fluid can be changed, for example, in the range of the flow velocity of 1 to 10 ml/min by changing the applied voltage. According to the supplying method of the cleaning fluid, instead of the applied voltage, the flow velocity may be changed by changing the operation cycle of the washing pump 106 (FIG. 1) or the like. It is preferable to select the washing time, for example, in the range in which a total of the inner wall washing time and the outer wall washing time of the nozzle 109 is 0 to 20 seconds.

As an example, in the washing pattern A, methanol (MeOH) is used as the cleaning fluid for the inner wall and the outer wall of the nozzle 109 (FIG. 1), the washing is performed in the flow velocity of the cleaning fluid of 2 ml/min, the washing time for the inner wall of 10 seconds, and the washing time for the outer wall of 10 seconds. In the washing pattern B, methanol (MeOH) is used as the cleaning fluids, the washing is performed in the flow velocity of the cleaning fluid of 5 ml/min, the washing time for the inner wall of 15 seconds, and the washing time for the outer wall of 5 seconds. The washing pattern B is preferable, for example, when the detection sensitivity of the component to be measured in the measurement item of the next analysis is low, and the influence of carry-over from the previous analysis is to be reduced as much as possible.

In the washing pattern C, ultrapure water is used as the cleaning fluid for the inner wall, the system water 105 is used as the cleaning fluid for the outer wall, and the washing is performed in the flow velocity of the cleaning fluid of 2 ml/min, the washing time for the inner wall of 10 seconds, and the washing time for the outer wall of 10 seconds. The washing pattern C is preferable, for example, when the components to be measured in the measurement item of the next analysis are hydrophilic, and the washing is performed with an aqueous solvent.

In the washing pattern D, ultrapure water is used as the cleaning fluid for the inner wall, the system water 105 is used as the cleaning fluid for the outer wall, and the washing is performed in the flow velocity of the cleaning fluid of 5 ml/min, the washing time for the inner wall of 15 seconds, and the washing time for the outer wall of 5 seconds. The washing pattern D is preferable, for example, when the components to be measured of the measurement item are hydrophilic, the detection sensitivity is low, and the influence of carry-over from the previous analysis is reduced as much as possible.

Note that the contents of the washing conditions for each washing pattern may be changeable according to the will of the user. When setting the washing conditions for each measurement item, it is preferable to set the same procedure for each washing condition.

Figure 7:
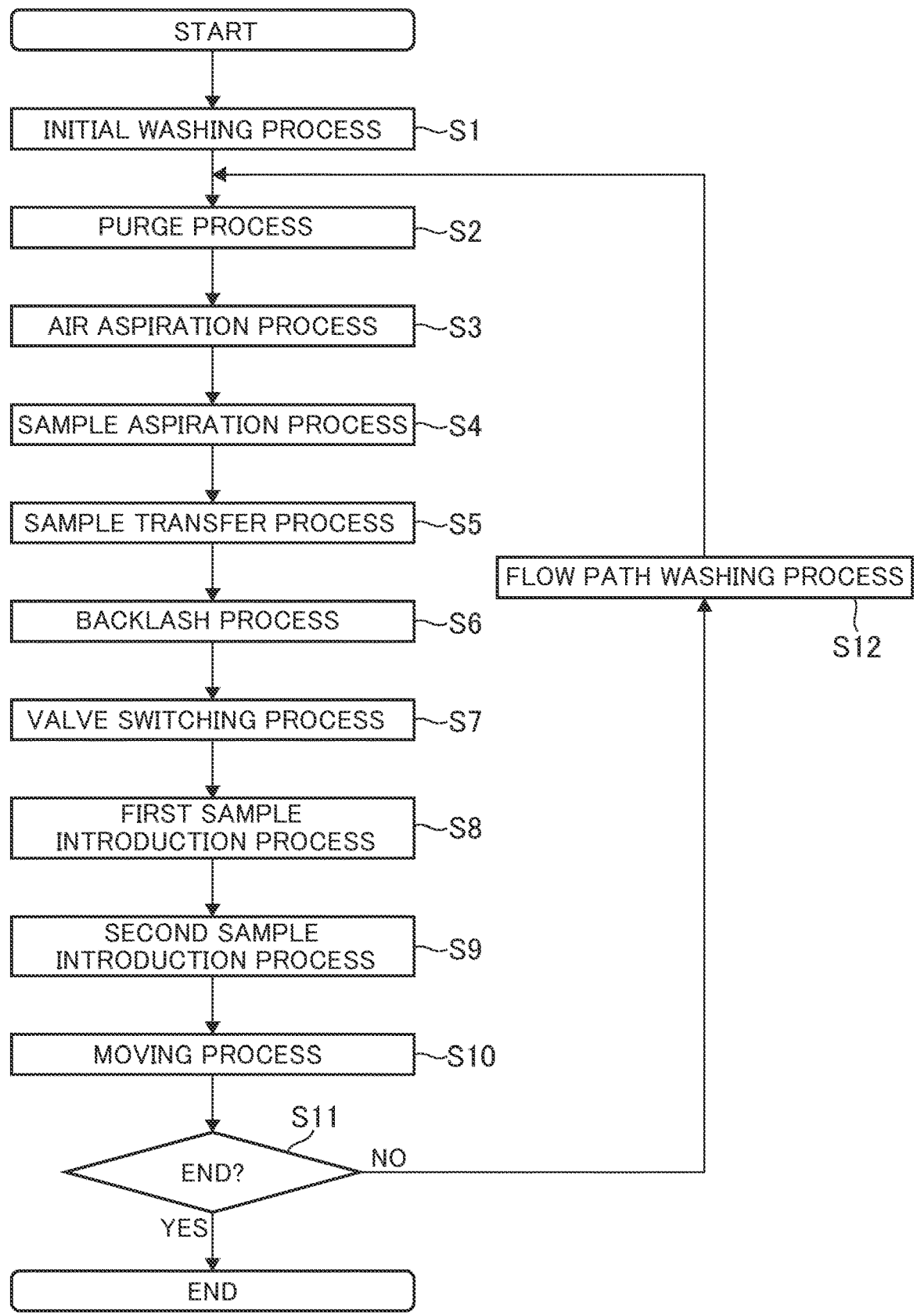
FIG. 7 is a flowchart showing a flow path washing method of the auto sampler according to the present embodiment.

FIG. 7 is a flowchart showing a flow path washing method of the auto sampler 1 (FIG. 1) according to the present embodiment. The flow path washing method shown in FIG. 7 can be performed by the flow path washing device 10 (FIG. 1). As an example, the measurement item is testosterone (No. 1 in FIG. 5), and a washing operation and a sample dispensing operation according to the washing pattern A before measurement are described further with reference to FIG. 1.

First, in initial washing process S1, for example, the control unit 118 that receives a command to perform the washing pattern A searches the table shown in FIG. 6, reads a washing method of the washing pattern A, and washes the inner and outer walls of the nozzle 109 by the corresponding washing method.

When washing the inner wall, the control unit 118 moves the nozzle 109 to the drain port 402 (FIG. 4) of the washing tub 107. Thereafter, the control unit 118 sets the solenoid valves 110, 111, and 112 to the normally open side, operates the washing pump 106, and transfers the cleaning fluid 117 (methanol) to the nozzle 109 through the first flow path 11 (FIG. 1). Here, the control unit 118 adjusts the voltage applied to the washing pump 106 to adjust the flow velocity of the cleaning fluid 117 to 2 ml/min.

When washing the outer wall, the control unit 118 moves the nozzle 109 to the inside of the organic solvent washing port 403 (FIG. 4) of the washing tub 107, switches the solenoid valve 110 to the normally closed side, and switches the solenoid valve 112 to the normally open side. The control unit 118 operates the washing pump 106 and transfers the cleaning fluid 117 (methanol) to the organic solvent washing port 403 of the washing tub 107 via the second flow path 12 (FIG. 1). Here, the control unit 118 adjusts the voltage applied to the washing pump 106 and sets the flow velocity of the cleaning fluid 117 to 2 ml/min. While the outer wall of the nozzle 109 is washed, the cleaning fluid 117 overflowing from the organic solvent washing port 403 of the washing tub 107 is discharged to a discharge port (not shown) of the washing tub 107.

Next, in purge process S2, the control unit 118 moves the nozzle 109 to the drain port 402 (FIG. 4) of the washing tub 107 and then purges the inside of the nozzle 109. The purging is performed with the system water 105, and accordingly, the inner walls of the nozzle 109 is washed. Specifically, the control device 118 opens the two-way solenoid valve (not shown) provided between the measurement unit 103 and the gear pump 104 to supply the system water 105 to the nozzle 109 and purges the nozzle 109.

Next, in air aspiration process S3, the control unit 118 moves the nozzle 109 onto the sample cup 108 for sample aspiration. Here, the control unit 118 simultaneously performs air aspiration as the segmented air. During the air aspiration, the control unit 118 switches the solenoid valve 111 to the normally closed side and then drives the weighing unit 103 to aspirate the air. By sandwiching the segmented air before sample aspiration, mixing of the cleaning fluid and the sample solution in the nozzle 109 is prevented, and diffusion of the sample in sample aspiration process S4 (described below) is reduced. In the present embodiment, the measurement unit 103 is driven for 25 pulses, for example, to aspirate 5 µL of air.

After air aspiration process S3, in sample aspiration process S4, the control unit 118 lowers the nozzle 109 in the height direction (Z direction) to the sample aspiration position and drives the measurement unit 103 to aspirate the sample. In the present embodiment, the measurement unit 103 is driven for 175 pulses, for example, to aspirate 35 µL of sample. Samples are biological samples such as serum, plasma, urine, and biological tissue, and samples other than biological samples are calibration samples and quality control (QC) samples. The control unit 118 processes the sample in the pre-processing unit (not shown) and transfers the sample cup 108 including the sample to the sample cup holding unit (not shown) of the auto sampler 1.

Next, in sample transfer process S5, the sample is transferred. After returning the nozzle 109 to the home position in the height direction (in the Z direction), the control unit 118 drives the measurement unit 103 to aspirate air to transfer the aspirated sample to the vicinity of the sample loop 102. According to the present embodiment, for example, the measurement unit 103 is driven for 150 pulses to aspirate 30 µL of air.

Next, in backlash process S6, backlash is performed. To eliminate the pressure difference generated in the flow path due to the syringe drive up to sample transfer process S5, the syringe driving is operated to the ejection side. In the present embodiment, the measurement unit 103 is driven for 5 pulses to discharge 1 µL of air.

Next, in valve switching process S7, the sample introduction valve 101 is switched. The control unit 118 switches the sample introduction valve 101 from the first position (FIG. 2A) to the second position (FIG. 2B). Accordingly, as shown in FIG. 2B, the nozzle 109, the sample loop 102, and the solenoid valve 111 are connected.

Next, the sample is introduced into the sample loop 102 in first sample introduction process S8. After switching the sample introduction valve 101, the control unit 118 drives the measurement unit 103 to discharge the sample into the sample loop 102. In the present embodiment, for example, the measurement unit 103 is driven by 50 pulses to discharge 10 μL of the sample to the sample loop 102. The amount of the sample introduced into the sample loop 102 is variable according to the drive amount of the measurement unit 103.

Next, the sample is introduced into the separate column 114 in second sample introduction process S9. After the sample is introduced into the sample loop 102, the control unit 118 switches the sample introduction valve 101 from the second position (FIG. 2B) to the first position (FIG. 2A). As a result, the feed pump 113, the sample loop 102, and the separate column 114 are connected as shown in FIG. 2A. The sample solution in the sample loop 102 is introduced into the separate column 114 by the moving phase fed from the feed pump 113.

Next, in moving process S10, the control unit 118 moves the measurement unit 103 to the home position. As a result, a series of sample introduction is completed, and the target component is separated from the sample by the separate column 114 and detected by the detector 115.

When there is no other sample and the analysis ends (Yes in determination process S11), the control unit 118 ends the operation. On the other hand, if there is another sample, and the analysis is to be continued (No in determination process S11), the control unit 118 repeats purge process S2 and subsequent processes after performing flow path washing process S12.

Flow path washing process S12 is performed by supplying the cleaning fluids 116 and 117 to the first flow path 11 or the second flow path 12 between the measurement of the first measurement item and the measurement of the second measurement item. The control unit 118 supplies the cleaning fluids 116 and 117 from the cleaning fluid supply mechanism 13 to the flow path switched by the flow path switching mechanism 14 between the first flow path 11 and the second flow path 12. Accordingly, it is possible to wash the first flow path 11 including the inner wall of the nozzle 109 and the sample loop 102 and the outer wall of the nozzle 109 in the washing tub 107. When the cleaning fluids 116 and 117 are supplied, the control unit 118 changes the flow velocity of the cleaning fluids 116 and 117 based on first washing information showing a washing pattern corresponding to the first measurement item of the sample and second washing information showing a washing pattern corresponding to the second measurement item to be measured subsequent to the first measurement item. The change can be made, for example, to the standard washing conditions (standard conditions) shown in FIG. 6 above.

For example, when testosterone (No. 1 in FIG. 5. first measurement item) is measured as a measurement item, and then estradiol (No. 2 in FIG. 5. second measurement item) is measured, the flow velocity of the cleaning fluids 116 and 117 in the washing pattern B (FIG. 6) corresponding to estradiol is changed from the flow velocity illustrated in FIG. 6. When testosterone is measured repeatedly, as shown in FIG. 5, the washing pattern A corresponding to testosterone is performed whenever one time of measurement is completed.

As such, when it is considered that carry-over is likely to occur due to the sample, reagent, and the like used in the first measurement item, for example, the flow velocity (total flow velocity in a predetermined washing time) is increased, and washing is performed thoroughly, to prevent the accuracy deterioration. Meanwhile, for example, if the influence of carry-over is negligible, for example, washing can be omitted or simplified. Therefore, in such a case, the flow velocity (total flow rate in a predetermined washing time) can be reduced to perform washing simply or not perform washing, so that both preventing a reduction in throughput of analysis and preventing an increase in cleaning fluid consumption can be achieved.

In the case of the third and subsequent measurement items, the control unit 118 changes the flow velocity of the cleaning fluids 116 and 117 at the time of washing performed immediately before the third measurement item based on first washing information (for example, the second measurement item) and third washing information showing a washing pattern corresponding to a third measurement item to be measured before the first measurement item (for example, the first measurement item). Accordingly, considering the influence of the sample, the reagent, and the like used, for example, in the measurement of the first and second measurement items, washing can be performed before the measurement of the third measurement item, and thus both preventing a reduction in throughput of analysis and preventing an increase in cleaning fluid consumption can be achieved more efficiently.

The control unit 118 changes the supply time of the cleaning fluids 116 and 117 based on the first washing information and at least one of the second washing information and the third washing information. The supply time to the first flow path 11 is the washing time of the inner wall of the nozzle 109 (FIG. 6). The supply time to the washing tub 107 is the contact time of the nozzle 109 with the outer wall in the washing tub 107 and the washing time of the outer wall (FIG. 7). By changing the supply time together with the flow velocity, both preventing a reduction in throughput of analysis and preventing an increase in cleaning fluid consumption can be achieved more efficiently.

The control unit 118 changes the flow velocity of the cleaning fluids 116 and 117 based on the easiness of carry-over of at least one of the samples and measurement items used at least immediately before supplying the cleaning fluids 116 and 117. The kinds of the cleaning fluids 116 and 117 are preferably maintained and not changed. Since the easiness of carry-over is determined to some extent by the sample and measurement items, the occurrence of carry-over can be prevented as such. For example, in the case of samples or measurement items that are likely to occur carry-over, the influence of carry-over can be reduced by making the flow velocity faster than the standard conditions shown in FIG. 6. Here, the washing time (supply time of the cleaning fluids 116 and 117) may be lengthened, if necessary. On the other hand, in the case of samples or measurement items that are difficult to carry-over, the consumption of the cleaning fluids 116 and 117 used can be prevented by making the flow velocity shorter than the standard conditions shown in FIG. 6. Here, the supply time (washing time) of the cleaning fluids 116 and 117 may be shortened, if necessary.

However, when the flow velocity of the cleaning fluids 116 and 117 are increased, the supply time does not necessarily have to be lengthened, and the supply time does not have to be changed and may be shortened. Meanwhile, when the flow velocity of the cleaning fluids 116 and 117 are slowed down, the supply time does not necessarily have to be shortened, and the supply time does not have to be changed and may be lengthened. Therefore, the supply time may be appropriately determined according to the flow velocity and based on conditions such as the easiness of carry-over.

As described above, according to the embodiment of the present disclosure, by appropriately switching the washing conditions for the nozzle 109 corresponding to the conditions designated in the sample table (FIG. 5) and the washing pattern (FIG. 6), reduction of analysis throughput can be prevented. As such, in limited specimen processing time, carry-over between a plurality of samples can be prevented while preventing cleaning fluid consumption, and thus it is possible to provide a flow path washing method of the auto sampler 1 and the flow path washing device 10 that can improve the accuracy of measurement results.

The present disclosure is not limited to the above-described embodiments and includes various modifications. For example, the above-described embodiments have been described in detail to explain the present disclosure in an easy-to-understand manner and are not necessarily limited to those having all the described configurations. A part of the configuration of one embodiment can be replaced with the configuration of another embodiment, and the configuration of another embodiment can be added to the configuration of one embodiment. It is possible to add, delete, or replace a part of the configuration of each embodiment with another configuration.

REFERENCE SIGNS LIST

1: Auto sampler
10: Flow path washing apparatus
11: First flow path
12: Second flow path
13: Cleaning fluid supply mechanism
14: Flow path switching mechanism
101: Sample introduction valve
102: Sample loop
103: Measuring unit
104: Gear pump
105: System water
106: Washing pump
107: Washing tub
108: Sample cup
109: Nozzle
110, 111, 112: Solenoid valve
113: Feed pump
114: Separation column
115: Detector
116,117: Cleaning fluid
118: Control unit
201, 202, 203, 204, 205, 206: Port
402: Drain port
403: Organic solvent washing port
404: Water washing port
S1: Initial washing process
S2: Purge process
S3: Air aspiration process
S4: Sample aspiration process
S5: Sample transfer process
S6: Backlash process
S7: Valve switching process
S8: First sample introduction process
S9: Second sample introduction process
S10: Moving process
S11: Determination process
S12: Flow path washing process

The invention claimed is:

1. A flow path washing method of an auto sampler, wherein
when a cleaning fluid supply mechanism supplies cleaning fluid to a flow path which is switched by a flow path switching mechanism, among a first flow path including a nozzle for aspirating a sample and a sample loop for holding the sample aspirated from the nozzle and a second flow path including a washing tub for washing at least an outer wall of the nozzle, a control unit changes a flow velocity of the cleaning fluid supplied between measurement of a first substance and measurement of a second substance based on, among washing information showing washing patterns corresponding to different measurements of substances, first washing information showing a washing pattern corresponding to the first substance, second washing information showing a washing pattern corresponding to the second substance to be measured subsequent to the first substance, and third washing information showing a washing pattern corresponding to a third substance measured before the first substance.

2. The flow path washing method of an auto sampler according to claim 1, wherein
the control unit changes supply time of the cleaning fluid based on the first washing information and at least one of the second washing information and the third washing information.

3. The flow path washing method of an auto sampler according to claim 1, wherein
the washing information includes at least one of a kind of cleaning fluid for washing the first flow path, a kind of cleaning fluid supplied to the washing tub through the second flow path, a flow velocity of the cleaning fluid, washing time of the first flow path, and washing time of an outer wall of the nozzle at the washing tub.

4. The flow path washing method of an auto sampler according to claim 1, wherein the control unit changes the flow velocity of the cleaning fluid based on easiness of carry-over of the substance used at least immediately before supplying the cleaning fluid.

5. A flow path washing apparatus of an auto sampler, comprising:
a first flow path including a nozzle for aspirating a sample and a sample loop for holding the sample aspirated from the nozzle;
a second flow path including a washing tub for washing at least an outer wall of the nozzle;
a cleaning fluid supply mechanism for supplying cleaning fluid to the first flow path and the washing tub through the second flow path, respectively;
a flow path switching mechanism for switching a supply destination, of the cleaning fluid supplied by the cleaning fluid supply mechanism to the first flow path and the second flow path; and
a control unit configured to change a flow velocity of the cleaning fluid supplied between measurement of a first substance and measurement of a second substance based on, among washing information showing washing patterns corresponding to different measurements of substances, first washing information showing a washing pattern corresponding to the first substance, second washing information showing a washing pattern corresponding to the second substance to be measured subsequent to the first substance, and third washing information showing a washing pattern corresponding to a third substance measured before the first substance.

* * * * *